(12) United States Patent
Lai et al.

(10) Patent No.: US 10,379,285 B1
(45) Date of Patent: Aug. 13, 2019

(54) ELECTRONIC DEVICE

(71) Applicant: GIGA-BYTE TECHNOLOGY CO., LTD., New Taipei (TW)

(72) Inventors: Chih-Ming Lai, New Taipei (TW); Chung-Wei Chiang, New Taipei (TW); Yung-Shun Kao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 17 days.

(21) Appl. No.: 15/911,196

(22) Filed: Mar. 5, 2018

(30) Foreign Application Priority Data

Jan. 30, 2018 (TW) ............................. 107103189 A

(51) Int. Cl.
*F21V 8/00* (2006.01)
(52) U.S. Cl.
CPC .................................. *G02B 6/0085* (2013.01)
(58) Field of Classification Search
CPC .................................................. G02B 6/0085
USPC ....................................................... 362/612
See application file for complete search history.

(56) References Cited

U.S. PATENT DOCUMENTS

| | | | | | |
|---|---|---|---|---|---|
| 9,016,912 | B1* | 4/2015 | Gustafson | ............ | B60Q 1/0088 362/485 |
| 10,209,562 | B2* | 2/2019 | Nameda | ............ | G02F 1/133603 |
| 2004/0004827 | A1* | 1/2004 | Guest | .................... | G02B 6/0091 362/612 |
| 2010/0270943 | A1* | 10/2010 | Cook | ........................ | A61L 9/03 315/291 |
| 2011/0164415 | A1* | 7/2011 | Chien | ........................ | F21S 9/02 362/231 |
| 2012/0262906 | A1* | 10/2012 | Wimbert | .................... | F21V 5/00 362/92 |

(Continued)

FOREIGN PATENT DOCUMENTS

| CN | 202854799 | 4/2013 |
|---|---|---|
| CN | 206178615 | 5/2017 |

OTHER PUBLICATIONS

"Office Action of Taiwan Counterpart Application", dated Oct. 16, 2018, p. 1-p. 5.

*Primary Examiner* — Bryon T Gyllstrom
(74) *Attorney, Agent, or Firm* — JCIPRNET

(57) ABSTRACT

An electronic device adapted for an expansion card is provided. The electronic device includes a main board and a light guide heat dissipation module. The main board includes a connector and a light source disposed beside the connector. The light guide heat dissipation module is detachably disposed on a position of the main board near the connector and is adapted to be thermally coupled to the expansion card inserted in the connector. The light guide heat dissipation module includes a first heat dissipation member, a second heat dissipation member thermally coupled to the first heat dissipation member, and a first light guide member disposed between the first heat dissipation member and the second heat dissipation member. The first heat dissipation member includes an opening, and the opening exposes a portion of the first light guide member. When the light guide heat dissipation module is disposed on the main board, light emitted by the light source is adapted to be guided by the first light guide member to the opening of the first heat dissipation member.

10 Claims, 5 Drawing Sheets

(56) References Cited

U.S. PATENT DOCUMENTS

| | | | |
|---|---|---|---|
| 2013/0336004 A1* | 12/2013 | Mulder | G02B 6/006 362/609 |
| 2015/0176832 A1* | 6/2015 | Metz | F21V 33/0044 362/89 |
| 2015/0211701 A1* | 7/2015 | Chien | F21S 8/035 362/644 |

* cited by examiner

ELECTRONIC DEVICE

CROSS-REFERENCE TO RELATED APPLICATION

This application claims the priority benefit of Taiwan application serial no. 107103189, filed on Jan. 30, 2018. The entirety of the above-mentioned patent application is hereby incorporated by reference herein and made a part of this specification.

BACKGROUND OF THE INVENTION

1. Field of the Invention

The invention relates to an electronic device. More particularly, the invention relates to an electronic device having a light guide heat dissipation module.

2. Description of Related Art

Nowadays, in many of the electronic devices, connectors are disposed on the main boards for allowing expansion cards to be connected to the main boards, and that users are able to add expansion capabilities to the electronic devices. Heat is generated when an expansion card works, and a heat dissipation module is thereby disposed on the expansion card to prevent overheating. Nevertheless, in a dark environment, it is difficult for a user find the location of the expansion card, and that the expansion card may not be inserted easily.

SUMMARY OF THE INVENTION

The invention provides an electronic device in which a light ray is emitted from a position where an expansion card is disposed so as to provide a slight illumination effect or a special visual effect.

An electronic device provided by an embodiment of the invention is adapted for an expansion card, and the electronic device includes a main board and a light guide heat dissipation module. The main board includes a connector and a light source disposed beside the connector. The light guide heat dissipation module is detachably disposed on a position of the main board near the connector and is adapted to be thermally coupled to the expansion card inserted in the connector. The light guide heat dissipation module includes a first heat dissipation member, a second heat dissipation member thermally coupled to the first heat dissipation member, and a first light guide member disposed between the first heat dissipation member and the second heat dissipation member. The first heat dissipation member includes an opening, and the opening exposes a portion of the first light guide member. When the light guide heat dissipation module is disposed on the main board, light emitted by the light source is adapted to be guided by the first light guide member to the opening of the first heat dissipation member.

In an embodiment of the invention, the light source includes a light emitting diode package and two pins extending from the light emitting diode package. The two pins are bendably fixed onto the main board. The first light guide member includes a light incident surface. When the light guide heat dissipation module is disposed on the main board, the light emitting diode package is located beside the light incident surface of the first light guide member and faces the light incident surface.

In an embodiment of the invention, the connector includes a top surface and a side surface coimected to the top surface, and the two pins are bent along a contour of the side surface and a contour of the top surface of the connector.

In an embodiment of the invention, the connector includes a groove recessed in the top surface, and the two pins are located inside the groove.

In an embodiment of the invention, the main board further includes a connector cover housing the connector and the light source and being fixed to the main board. The connector cover includes a slot. The second heat dissipation member includes a tongue plate. When the light guide heat dissipation module is disposed on the main board, the tongue plate of the second heat dissipation member extends into the slot of the connector cover.

In an embodiment of the invention, the main board further includes a second light guide member extending from the light source on the main board onto the connector. The first light guide member includes a light incident surface. When the light guide heat dissipation module is disposed on the main board, the second light guide member is in contact with the light incident surface.

In an embodiment of the invention, the connector includes a top surface and a side surface connected to the top surface, and the second light guide member is bent along a contour of the side surface and a contour of the top surface of the connector.

In an embodiment of the invention, the main board further includes a connector cover housing the connector and the light source and being fixed to the main board. The connector includes a first fixing portion, the connector cover includes a second fixing portion and a third fixing portion, and the second light guide member includes a fourth fixing portion. The first fixing portion of the connector and the fourth fixing portion of the second light guide member are respectively fixed to the second fixing portion and the third fixing portion of the connector cover.

In an embodiment of the invention, the first fixing portion of the connector and the second light guide member are two hooks. Each of the hooks has an inclined surface, and the inclined surface faces a top surface of the connector.

In an embodiment of the invention, the second heat dissipation member includes a through hole. When the light guide heat dissipation module is disposed on the main board, a fixing member is adapted to penetrate through the through hole of the second heat dissipation member to be fixed to the main board.

To sum up, the light guide heat dissipation module of the electronic device provided by the embodiments of the invention includes the first heat dissipation member and the second heat dissipation member and that may be thermally coupled to the expansion card to dissipate heat. In the electronic device, the light source is disposed beside the connector of the main board, and the first light guide member is disposed at the light guide heat dissipation module. As such, the light emitted by the light source on the main board is guided by first light guide member to the opening of the first heat dissipation member, and that a slight illumination effect or a light indication effect is provided.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
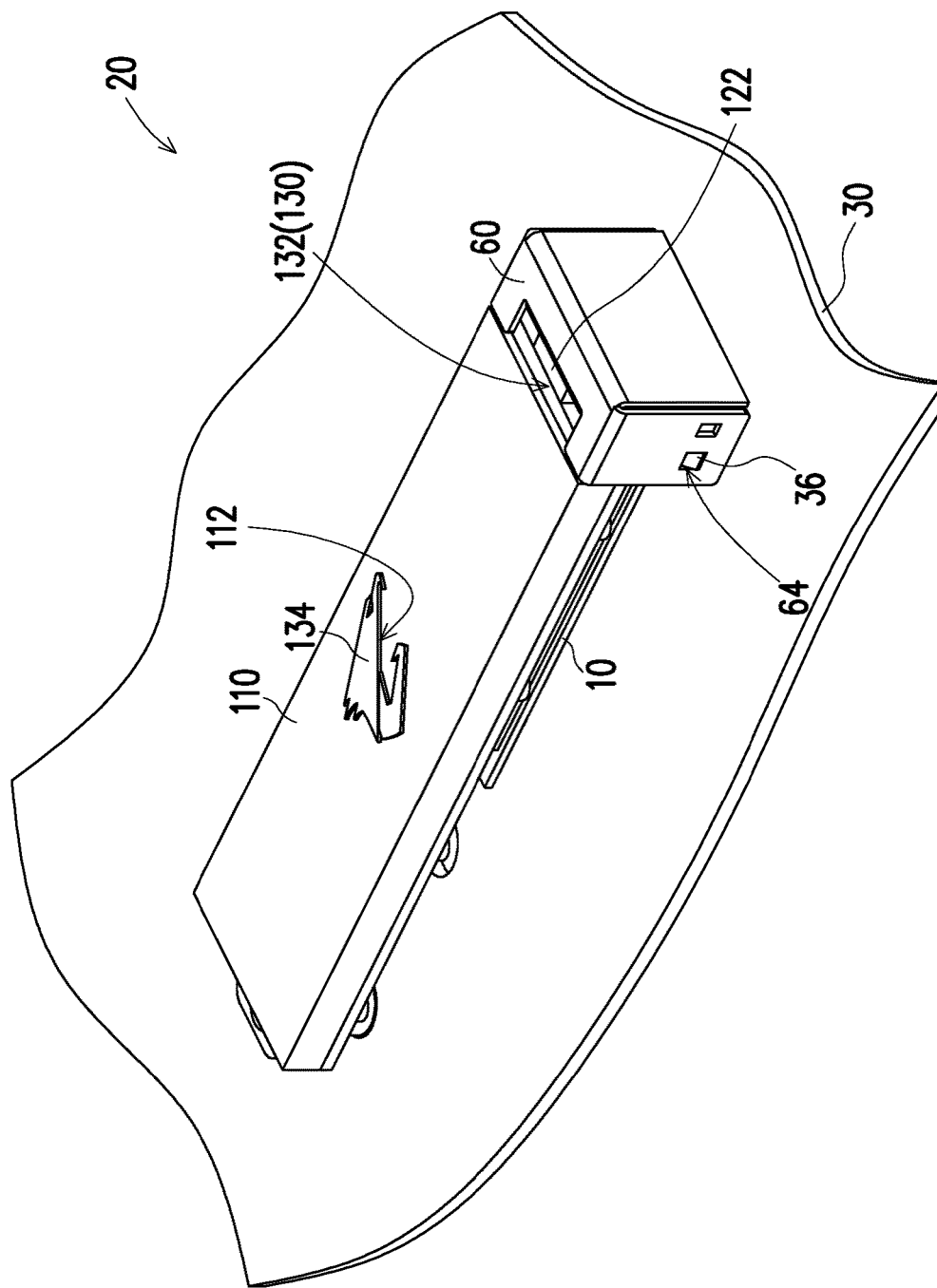
FIG. 1 is a schematic view of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
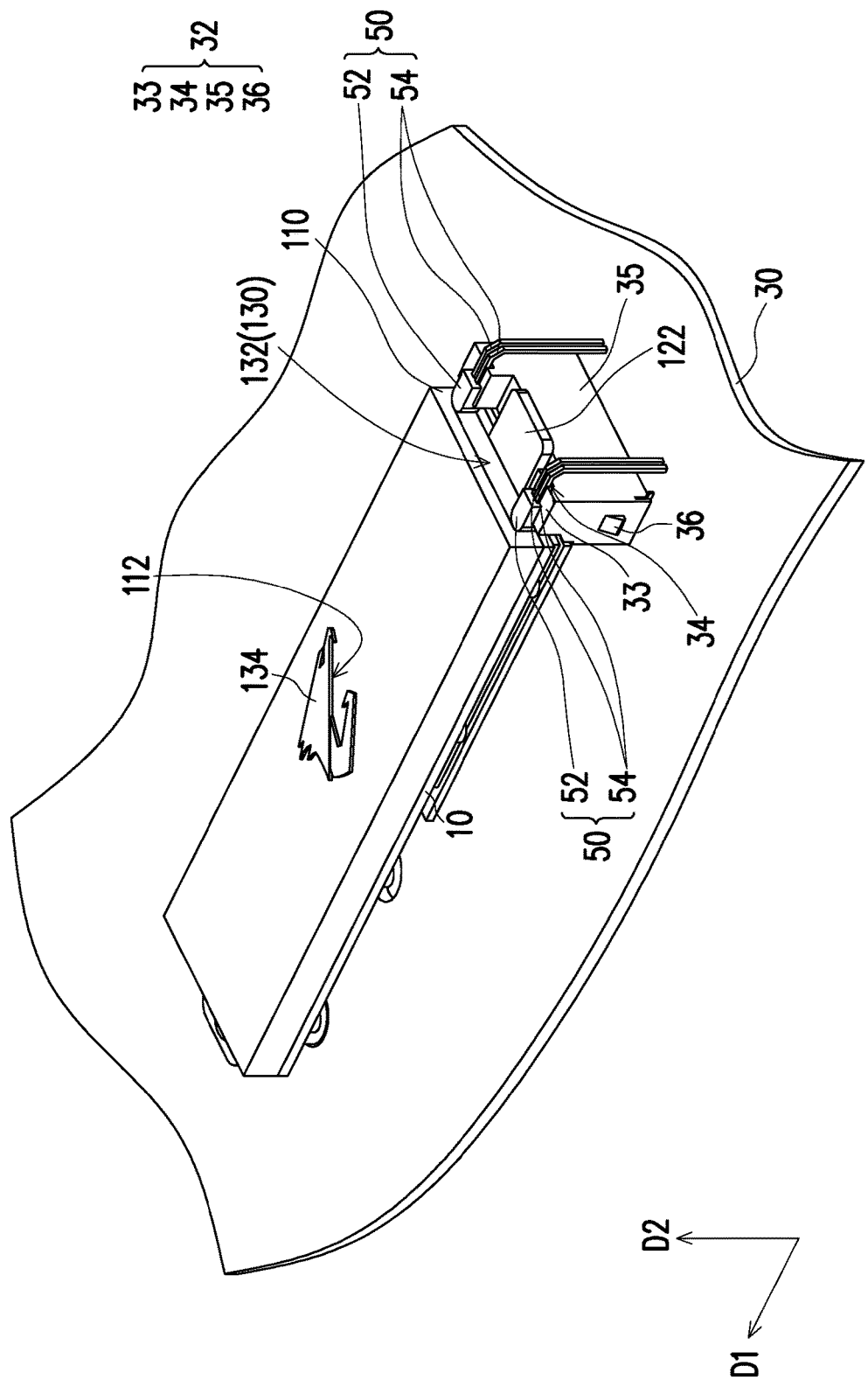
FIG. 2 is a schematic view of the electronic device of FIG. 1 without a connector cover.
Figure 3:
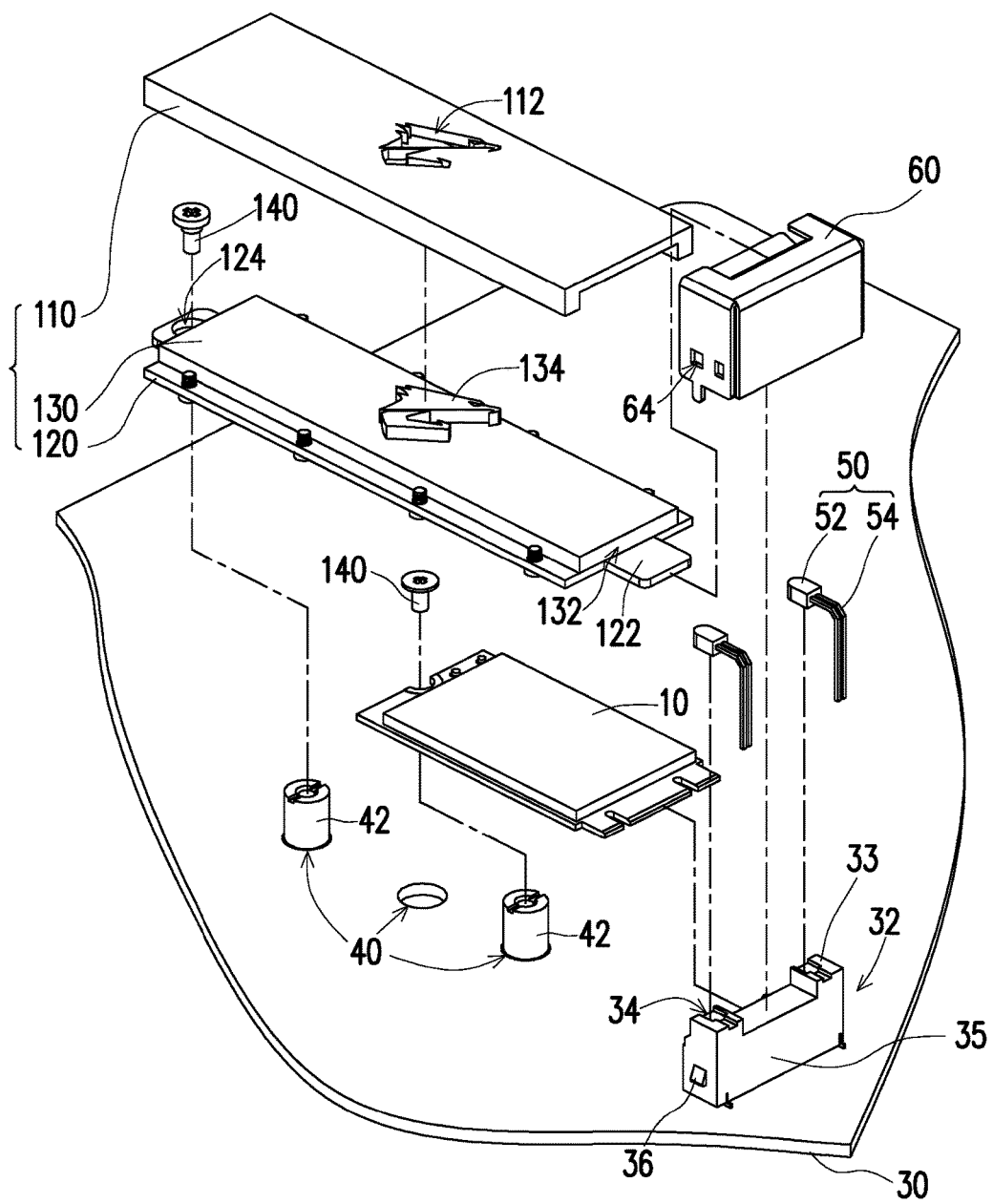
FIG. 3 and FIG. 4 are exploded schematic views of a light guide heat dissipation module of the electronic device of FIG. 1 in different view angles.
Figure 4:
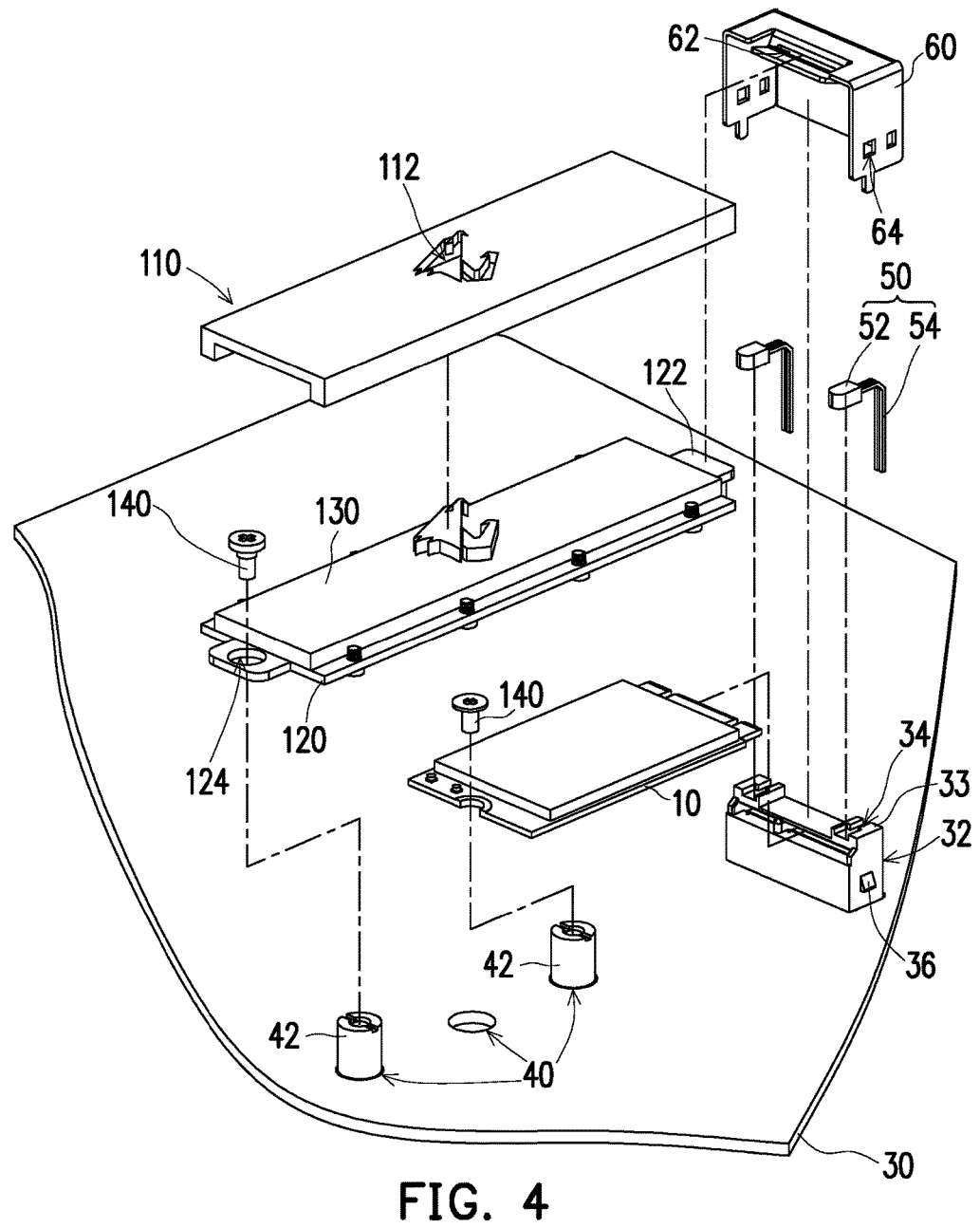

FIG. 1 is a schematic view of an electronic device according to an embodiment of the invention. FIG. 2 is a schematic view of the electronic device of FIG. 1 without a connector cover. FIG. 3 and FIG. 4 are exploded schematic views of a light guide heat dissipation module of the electronic device of FIG. 1 in different view angles. With reference to FIG. 1 to FIG. 4, an electronic device 20 of this embodiment includes a main board 30 and a light guide heat dissipation module 100. The main board 30 includes a connector 32 and at least one light source 50 disposed beside the connector 32. The connector 32 is adapted for an expansion card 10. In this embodiment, a connector with an M.2 interface is used as an example for the connector 32, and the connector 32 is provided for the expansion card 10 with the M.2 interface to be inserted therein. Nevertheless, types of the connector 32 and the corresponding expansion card 10 are not limited to the above.

As shown in FIG. 2, the at least one light source 50 is, for example, a straw-hat light emitting diode. Each of the at least one light source 50 includes a light emitting diode package 52 and two pins 54 extending from the light emitting diode package 52. The two pins 54 are bendably fixed onto the main board 30. In addition, the connector 32 includes a top surface 33 and a side surface 35 connected to the top surface 33 as shown in FIG. 3. In this embodiment, the two pins 54 of each of the at least one light source 50 are bent along a contour of the side surface 35 and a contour of the top surface 33 of the connector 32 and thus are bent into an L shape.

Besides, the connector 32 includes a groove 34 recessed in the top surface 33 in this embodiment. Portions of the two pins 54 on the top surface 33 are located inside the groove 34, as such, the pins 54 are better protected, the pins 54 are conveniently fixed to a position relative to the connector 32, and heights of the pins 54 may be reduced. The portions of the two pins 54 on the top surface 33 slightly exceed the top surface 33 in this embodiment; nevertheless, the portions of the two pins 54 on the top surface 33 may be flushed with the top surface 33 or may not exceed the top surface 33 in other embodiments. In addition, in an embodiment that is not shown, the side surface 35 of the connector 32 may also include a groove to contain the pins 54. Alternatively, in an embodiment that is not shown, the top surface 33 of the connector 32 may not have to include the groove 34.

The main board 30 further includes a connector cover 60 housing the connector 32 and the light source 50 and being fixed to the main board 30 in this embodiment. The connector cover 60 is made of an opaque material and may overlie the light source 50. A light emitting diode may be used as an example for the light source 50 in this embodiment. Although the light emitting diode is a directional light source which is brighter in a specific direction, the light emitting diode may also emit weaker light in other directions. The connector cover 60 of this embodiment covers the light source 50, such that a light ray is prevented from leaking from above. In addition, a material of the connector cover 60 is, for example, a metal material covering the connector 32, and an enhanced electromagnetic shield effect may thereby be provided.

Besides, in this embodiment, the connector 32 includes a first fixing portion 36, and the connector cover 60 includes a second fixing portion 64. The first fixing portion 36 of the connector 32 is fixed to the second fixing portion 64 of the connector cover 60. In this embodiment, the first fixing portion 36 of the connector 32 is a hook, and the second fixing portion 64 of the connector cover 60 is an engaging hole. The hook has an inclined surface, and the inclined surface faces the top surface 33 of the connector 32. As such, when the connector 32 is sleeved with the connector cover 60 from top to down, the engaging hole of the connector cover 60 slides along the inclined surface of the hook of the connector 32, and that the hook enters the engaging hole. The connector 32, the light source 50, and the connector cover 60 may act as a module in this embodiment. When assembling the module, first, the light source 50 is placed on the connector 32, and the connector cover 60 is used to house the connector 32 and the light source 50. Next, the connector 32, the light source 50, and the connector cover 60 may be soldered to the main board 30 together. Certainly, a method and an order of assembling the connector 32, the light source 50, and the connector cover 60 are not limited to the above, and a method and an order of assembling the connector 32, the light source 50, and the connector cover 60 to the main board 30 are not limited to the above either.

As shown in FIG. 3 and FIG. 4, in this embodiment, the light guide heat dissipation module 100 may be detachably disposed on a position of the main board 30 near the connector 32 and is adapted to be thermally coupled to the expansion card 10 inserted in the connector 32. In this embodiment, the light guide heat dissipation module 100 includes a first heat dissipation member 110, a second heat dissipation member 120 thermally coupled to the first heat dissipation member 110, and a first light guide member 130 disposed between the first heat dissipation member 110 and the second heat dissipation member 120. In this embodiment, a size of the first heat dissipation member 110 is similar to a size of the second heat dissipation member 120, and a size of the first light guide member 130 in a width direction is slightly less than a size of the first heat dissipation member 110 and a size of the second heat dissipation member 120 in the width direction. Therefore, the first heat dissipation member 110 and the second heat dissipation member 120 may encapsulate the first light guide member 130 in the width direction and are in contact with each other. The first heat dissipation member 110 and the second heat dissipation member 120 may be fixed with a screw in this embodiment, and the first heat dissipation member 110 and the second heat dissipation member 120 may also be fixed by adhering, engaging, riveting, and the like in other embodiments.

As shown in FIG. 4, the connector cover 60 includes a slot 62, and the second heat dissipation member 120 includes a tongue plate 122 in this embodiment. When the light guide heat dissipation module 100 is disposed on the main board 30, the tongue plate 122 of the second heat dissipation member 120 extends into the slot 62 of the connector cover 60, as such, one end of the second heat dissipation member 120 near the tongue plate 122 may be fixed to the connector cover 60. Besides, in this embodiment, the second heat dissipation member 120 includes a through hole 124, and a position of the through hole 124 is away from the tongue plate 122. When the light guide heat dissipation module 100 is disposed on the main board 30, after the tongue plate 122 of the second heat dissipation member 120 is extended into the slot 62 of the connector cover 60, the through hole 124 of the second heat dissipation member 120 is aligned with a holder 42 on the main board 30. A fixing member 140 is adapted to penetrate through the through hole 124 of the second heat dissipation member 120 to be fixed to the main board 30. In this way, two opposite ends of the second heat dissipation member 120 may be securely fixed to the main board 30, and the light guide heat dissipation module 100 is thereby securely fixed to the main board 30.

Note that in this embodiment, the connector 32 with the M.2 interface is used as an example for the connector 32. The expansion card 10 connected to the connector 32 features a specific size. As such, corresponding fixing holes 40 are designed on the main board 30, so as to fix one end (this end is away from the other end inserted into the connector 32) of the expansion card 10 to the main board 30. In this embodiment, such design is adopted by the light guide heat dissipation module 100, and a size of the light guide heat dissipation module 100 may be disposed to be a maximum size corresponding to the expansion card 10 with the M.2 interface. As shown in FIG. 3 and FIG. 4, in the light guide heat dissipation module 100, the fixing bases 42 may be disposed on the fixing holes 40, and that the second heat dissipation member 120 of the light guide heat dissipation module 100 may be fixed to the main board 30 conveniently as the fixing holes 40 are particularly retained for the connector 32 with the M.2 interface on the main board 30. Further, the size of the light guide heat dissipation module 100 may be disposed to be the maximum size corresponding to the expansion card 10 with the M.2 interface, as such, the light guide heat dissipation module 100 may be applied to the expansion cards 10 with the M.2 interface of other sizes. For instance, a length size of the expansion card 10 is less than a length size of the light guide heat dissipation module 100 in this embodiment. As such, the expansion card 10 and the light guide heat dissipation module 100 may be fixed to the fixing bases 42 disposed on different fixing holes 40. No other fixing hole is required to be additionally disposed on the main board 30 for the light guide heat dissipation module 100.

In this embodiment, when the light guide heat dissipation module 100 is installed on the main board 30, the second heat dissipation member 120 of the light guide heat dissipation module 100 is in contact with the expansion card 10. As such, heat generated by the expansion card 10 may be transmitted to the light guide heat dissipation module 100 to achieve a heat dissipation effect. Besides, the light guide heat dissipation module 100 also provides a light guide function in addition to dissipating heat for the expansion card 10.

To be specific, as shown in FIG. 2 and FIG. 3, the first light guide member 130 includes a light incident surface 132, and the light incident surface 132 is near the tongue plate 122 of the second heat dissipation member 120 in this embodiment. In addition, the first heat dissipation member 110 includes an opening 112, and the opening 112 exposes a portion of the first light guide member 130. When the light guide heat dissipation module 100 is disposed on the main board 30, the light emitting diode package 52 is located beside the light incident surface 132 of the first light guide member 130 and faces the light incident surface 132. As such, light emitted by the light source 50 may be transmitted to the first light guide member 130 and is guided by the first light guide member 130 to the opening 112 of the first heat dissipation member 110, and that a slight illumination effect or a light indication effect is provided.

The first light guide member 130 has a protruding portion 134 extending to the opening 112 of the first heat dissipation member 110 in this embodiment. A contour of the protruding portion 134 corresponds to a contour of the opening 112 of the first heat dissipation member 110. The protruding portion 134 may protrude from the first light guide member 130, and in this way, the light rays emitted may appear to be more three-dimensional in this embodiment. In addition, the protruding portion 134 may include notches or may include a rough surface, such that the light rays may be guided out more intensely. Certainly, the protruding portion 134 may also be flushed with the first light guide member 130, and that an appearance of the first light guide member 130 remains intact in other embodiments. Alternatively, the protruding portion 134 may be lower than the first light guide member 130. In other embodiments, the protruding portion 134 of the first light guide member 130 may be omitted, and the light emitted by the light source 50 may still be guided by the first light guide member 130 to the opening 112 of the first heat dissipation member 110.

Note that in this embodiment, a size of the first light guide member 130 in a length direction is similar to a size of the first heat dissipation member 110 and a size of the second heat dissipation member 120 in the length direction. Nevertheless, the size of the first light guide member 130 in the length direction may be reduced as well in other embodiments. For instance, the size of the first light guide member 130 in the length direction may range from a position near the light source 50 to the opening 112 of the first heat dissipation member 110 after the light guide heat dissipation module 100 is installed to the main board 30. In this way, the first light guide member 130 may provide the same function of guiding the light rays emitted by the light source 50 of the main board 30 to the opening 112 of the first heat dissipation member 110.

In this embodiment, since the light source 50 is disposed on the main board 30, the light source 50 may be controlled by a controller (not shown) on the main board 30 to emit lights of different colors. The controller may also adjust a light-dark frequency to show a meaning of a specific light signal. In this way, a user may know a usage state of the main board 30 upon seeing the colors of the lights of the protruding portion 134 of the first light guide member 130 as well as the light-dark frequency.

Note that in this embodiment, when the light guide heat dissipation module 100 is disposed on the main board 30, since a normal direction D1 (shown in FIG. 2) of the light incident surface 132 of the first light guide member 130 is perpendicular to a normal direction D2 of the main board 30, a light ray direction incident on the light incident surface 132 of the first light guide member 130 is required to be parallel to the normal direction D1 of the light incident surface 132 of the first light guide member 130 or in other words, to be perpendicular to the normal direction D2 of the main board

30. In FIG. 2, on the main board 30, the two pins 54 of the light source 50 are bent, as such, the light emitting diode package 52 faces the light incident surface 132. In this way, the light source 50 is able to provide a light ray parallel to the normal direction D1 of the light incident surface 132 of the first light guide member 130. Nevertheless, a method of providing the light ray parallel to the normal direction D1 of the light incident surface 132 of the first light guide member 130 is not limited to the above.

Figure 5:
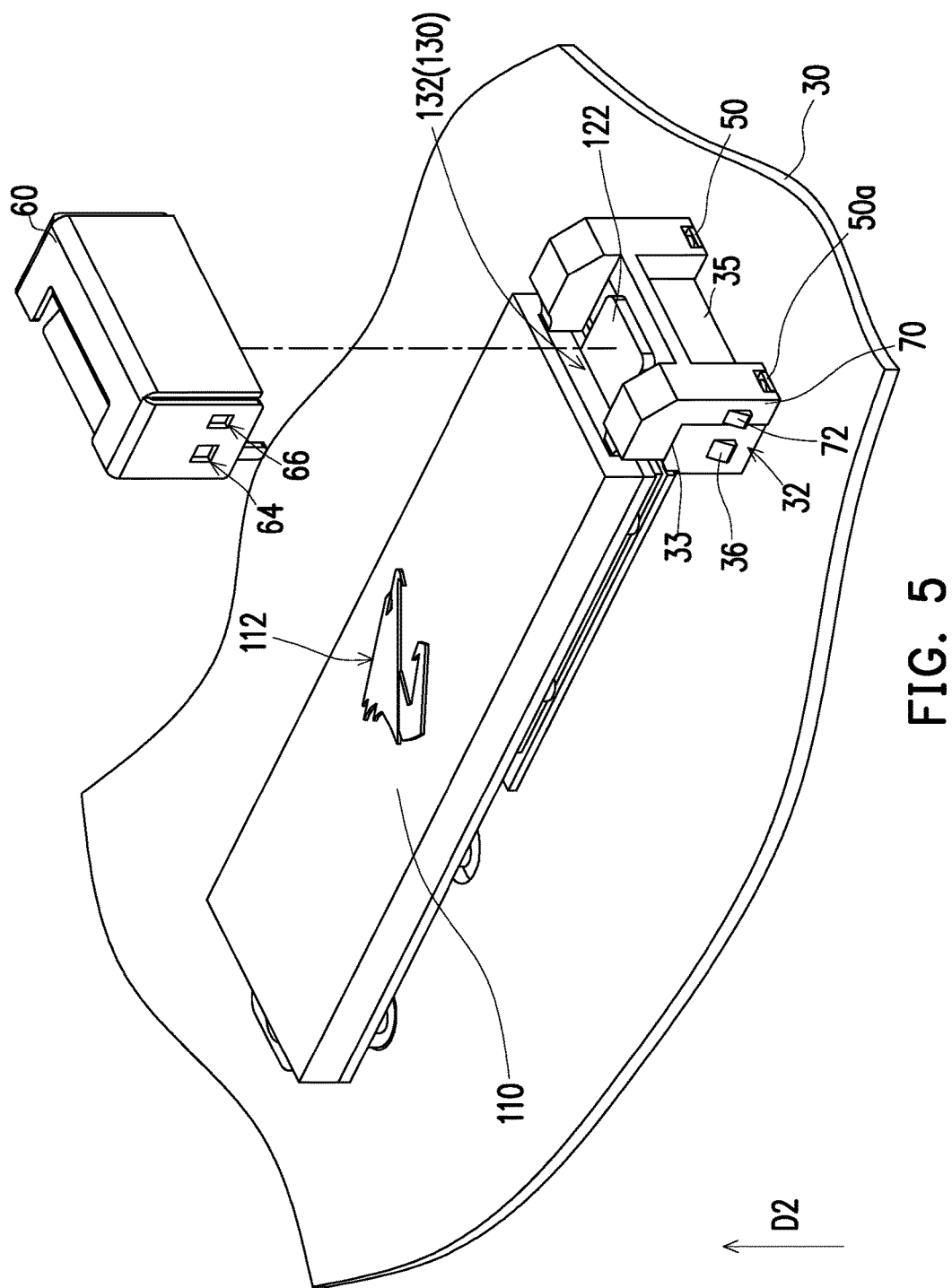
FIG. 5 is a schematic view of an electronic device with a connector cover being moved upwards according to another embodiment of the invention.

FIG. 5 is a schematic view of an electronic device with a connector cover being moved upwards according to another embodiment of the invention. With reference to FIG. 5, a difference between the embodiment of FIG. 5 and the embodiment of FIG. 2 includes the following. In this embodiment, a light source 50*a* does not have pins that are bent, a light ray direction of the light source 50*a* disposed on the main board 30 is parallel to the normal direction D2 of the main board 30, and the main board 30 further includes a second light guide member 70 extending from the light source 50*a* on the main board 30 onto the connector 32. In this embodiment, the second light guide member 70 is bent along the contour of the side surface 35 and the contour of the top surface 33 of the connector 32 and thus is bent into an L shape. But a shape of the second light guide member 70 is not limited to the above. When the light guide heat dissipation module 100 is disposed on the main board 30, the second light guide member 70 is in contact with the light incident surface 132 of the first light guide member 130. As such, light emitted by the light source 50*a* is transmitted out of the opening 112 of the first heat dissipation member 110 sequentially through the second light guide member 70 and the first light guide member 130.

Besides, in this embodiment, the connector cover 60 further includes a third fixing portion 66, and the second light guide member 70 includes a fourth fixing portion 72. Moreover, the fourth fixing portion 72 of the second light guide member 70 is fixed to the third fixing portion 66 of the connector cover 60. In this embodiment, the fourth fixing portion 72 of the second light guide member 70 is a hook with an inclined surface, and the inclined surface of the hook faces the top surface of the connector 32. The third fixing portion 66 of the connector cover 60 is an engaging hole. When the fourth fixing portion 72 is engaged with the third fixing portion 66, the second light guide member 70 is fixed to the connector cover 60. The connector 32, the second light guide member 70, and the connector cover 60 may act as a module in this embodiment. When assembling the module, first, the second light guide member 70 is placed on the connector 32. The second light guide member 70 and the connector 32 may be fixed to each other by adhering or may not be fixed to each other. Next, the connector cover 60 is used to house the connector 32 and the second light guide member 70. The connector 32 and the connector cover 60 are then soldered to the main board 30 together. Certainly, a method and an order of assembling the connector 32, the second light guide member 70, and the connector cover 60 are not limited to the above, and a method and an order of assembling the connector 32, the second light guide member 70, and the connector cover 60 to the main board 30 are not limited to the above either.

In view of the foregoing, the light guide heat dissipation module of the electronic device provided by the embodiments of the invention includes the first heat dissipation member and the second heat dissipation member and that may be thermally coupled to the expansion card to dissipate heat. In the electronic device, the light source is disposed beside the connector of the main board, and the first light guide member is disposed at the light guide heat dissipation module. As such, the light emitted by the light source on the main board is guided by first light guide member to the opening of the first heat dissipation member, and that a slight illumination effect or a light indication effect is provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, adapted for an expansion card, the electronic device comprising:
   a main board, comprising a connector and a light source disposed beside the connector; and
   a light guide heat dissipation module, detachably disposed on a position of the main board near the connector and adapted to be thermally coupled to the expansion card inserted in the connector, the light guide heat dissipation module comprising a first heat dissipation member, a second heat dissipation member thermally coupled to the first heat dissipation member, and a first light guide member disposed between the first heat dissipation member and the second heat dissipation member, the first heat dissipation member comprising an opening, the opening exposing a portion of the first light guide member, wherein
   light emitted by the light source is adapted to be guided by the first light guide member to the opening of the first heat dissipation member when the light guide heat dissipation module is disposed on the main board.

2. The electronic device as claimed in claim 1, wherein the light source comprises a light emitting diode package and two pins extending from the light emitting diode package, the two pins are bendably fixed onto the main board, the first light guide member comprises a light incident surface, and the light emitting diode package is located beside the light incident surface of the first light guide member and faces the light incident surface when the light guide heat dissipation module is disposed on the main board.

3. The electronic device as claimed in claim 2, wherein the connector comprises a top surface and a side surface connected to the top surface, and the two pins are bent along a contour of the side surface and a contour of the top surface of the connector.

4. The electronic device as claimed in claim 3, wherein the connector comprises a groove recessed in the top surface, and the two pins are located inside the groove.

5. The electronic device as claimed in claim 1, wherein the main board further comprises a connector cover housing the connector and the light source and being fixed to the main board, the connector cover comprises a slot, the second heat dissipation member comprises a tongue plate, and the tongue plate of the second heat dissipation member extends into the slot of the connector cover when the light guide heat dissipation module is disposed on the main board.

6. The electronic device as claimed in claim 1, wherein the main board further comprises a second light guide member extending from the light source on the main board onto the connector, the first light guide member comprises a light incident surface, and the second light guide member is in contact with the light incident surface when the light guide heat dissipation module is disposed on the main board.

7. The electronic device as claimed in claim 6, wherein the connector comprises a top surface and a side surface connected to the top surface, and the second light guide member is bent along a contour of the side surface and a contour of the top surface of the connector.

8. The electronic device as claimed in claim 6, wherein the main board further comprises a connector cover housing the connector and the light source and being fixed to the main board, the connector comprises a first fixing portion, the connector cover comprises a second fixing portion and a third fixing portion, the second light guide member comprises a fourth fixing portion, and the first fixing portion of the connector and the fourth fixing portion of the second light guide member are respectively fixed to the second fixing portion and the third fixing portion of the connector cover.

9. The electronic device as claimed in claim 8, wherein the first fixing portion of the connector and the second light guide member are two hooks, each of the hooks has an inclined surface, and the inclined surface faces a top surface of the connector.

10. The electronic device as claimed in claim 1, wherein the second heat dissipation member comprises a through hole, and a fixing member is adapted to penetrate through the through hole of the second heat dissipation member to be fixed to the main board when the light guide heat dissipation module is disposed on the main board.

* * * * *